(12) United States Patent
Phoha et al.

(10) Patent No.: US 8,127,357 B1
(45) Date of Patent: *Feb. 28, 2012

(54) METHOD TO DETECT SYN FLOOD ATTACK

(75) Inventors: Vir V Phoha, Ruston, LA (US); Kiran S Balagani, Ruston, LA (US)

(73) Assignee: Louisiana Tech Research Foundation; A Division of Louisiana Tech University Foundation, Inc., Ruston, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,555

(22) Filed: Nov. 30, 2010

Related U.S. Application Data

(63) Continuation of application No. 11/844,841, filed on Aug. 24, 2007, now Pat. No. 7,865,954.

(51) Int. Cl.
*G06F 21/20* (2006.01)
*G06F 15/16* (2006.01)
*G06F 11/30* (2006.01)

(52) U.S. Cl. .......................................... 726/23; 709/224
(58) Field of Classification Search ........................ None
See application file for complete search history.

(56) References Cited

U.S. PATENT DOCUMENTS

| | | | | |
|---|---|---|---|---|
| 6,816,910 B1 * | 11/2004 | Ricciulli | ...................... | 709/237 |
| 7,043,756 B2 * | 5/2006 | Tsafnat et al. | .................. | 726/23 |
| 7,058,718 B2 * | 6/2006 | Fontes et al. | .................. | 709/228 |
| 7,190,671 B2 * | 3/2007 | D'Souza et al. | ............... | 370/232 |
| 7,283,461 B2 * | 10/2007 | D'Souza et al. | ............... | 370/210 |
| 7,284,272 B2 * | 10/2007 | Howard et al. | .................. | 726/22 |
| 7,363,652 B2 * | 4/2008 | Yang et al. | ......................... | 726/11 |
| 7,464,410 B1 * | 12/2008 | Halasz et al. | .................... | 726/23 |
| 7,512,980 B2 * | 3/2009 | Copeland et al. | ............... | 726/23 |
| 7,657,934 B2 * | 2/2010 | Poletto et al. | .................... | 726/22 |
| 7,865,954 B1 * | 1/2011 | Phoha et al. | ..................... | 726/23 |
| 2003/0226035 A1 * | 12/2003 | Robert et al. | ................. | 713/201 |
| 2004/0153669 A1 * | 8/2004 | Yang et al. | ..................... | 713/201 |
| 2007/0226239 A1 * | 9/2007 | Johnson et al. | ............... | 707/101 |

\* cited by examiner

*Primary Examiner* — Christopher Revak
(74) *Attorney, Agent, or Firm* — Jones, Walker, Waechter, Poitevent, Carrere & Denegre, LLP

(57) ABSTRACT

A method of predicting a SYN flooding attack on a server. The method tracks the number of SYN signals received (or SYN+ACK signals sent) over the communications port of the server in a specified time interval, the arrival estimation window. The invention then predicts the number of anticipated ACK, RST or ACK+RST signals to be received over the communication port within a predetermined time length prediction window. The prediction may be made at multiple points within the prediction window. The prediction window is offset in time from the arrival estimation window. The prediction of ACK signals to be received is based upon the number of SYN signals received or SYN+ACK signals sent in the arrival estimation window. In one embodiment, a polynomial is fit to the data in the Arrival estimation window and extrapolated to the prediction window. The predicted number of ACK, or RST or ACK+RST signals is compared to the actual number received in the prediction window, and if the difference is in excess of a threshold value, and attack is indicated.

15 Claims, 8 Drawing Sheets

Diagram showing the four significant steps in SYN Flooding detection algorithm.

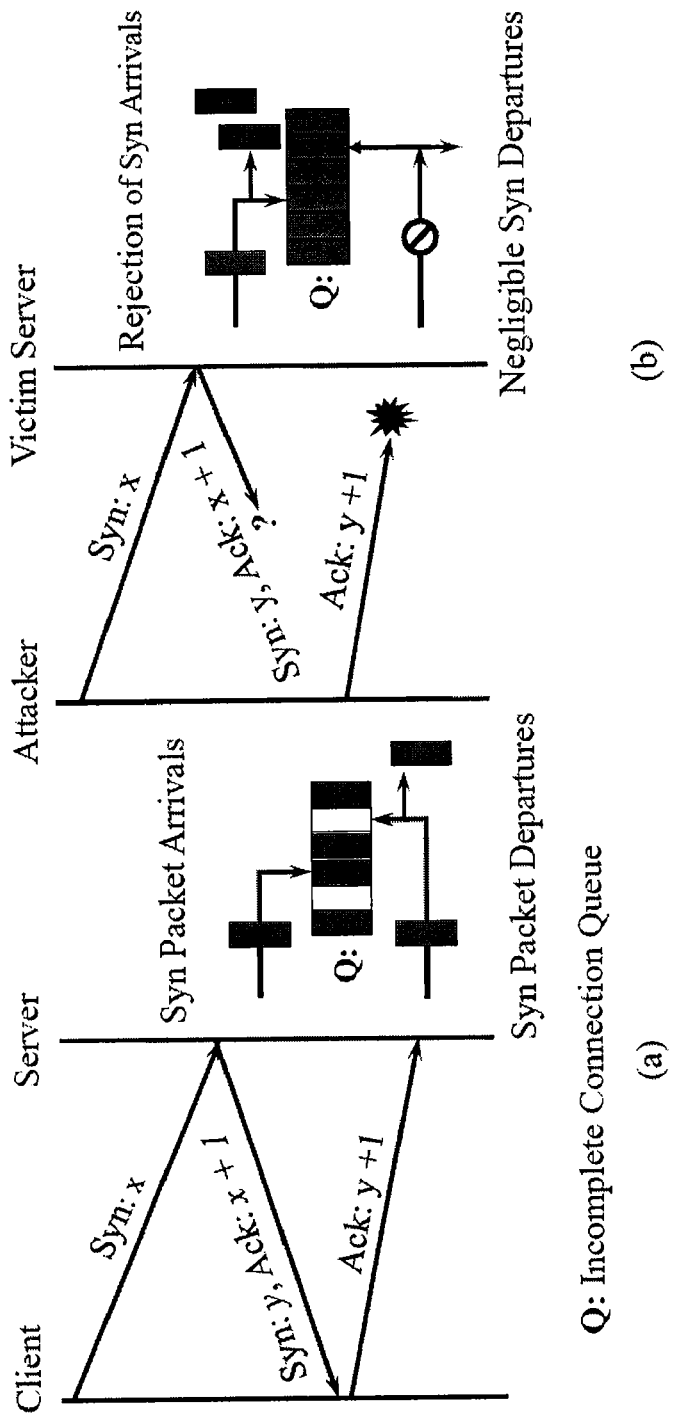
Figure 1(a) illustrates a normal TCP connection establishment, while Figure 1(b) illustrates an attack situation.

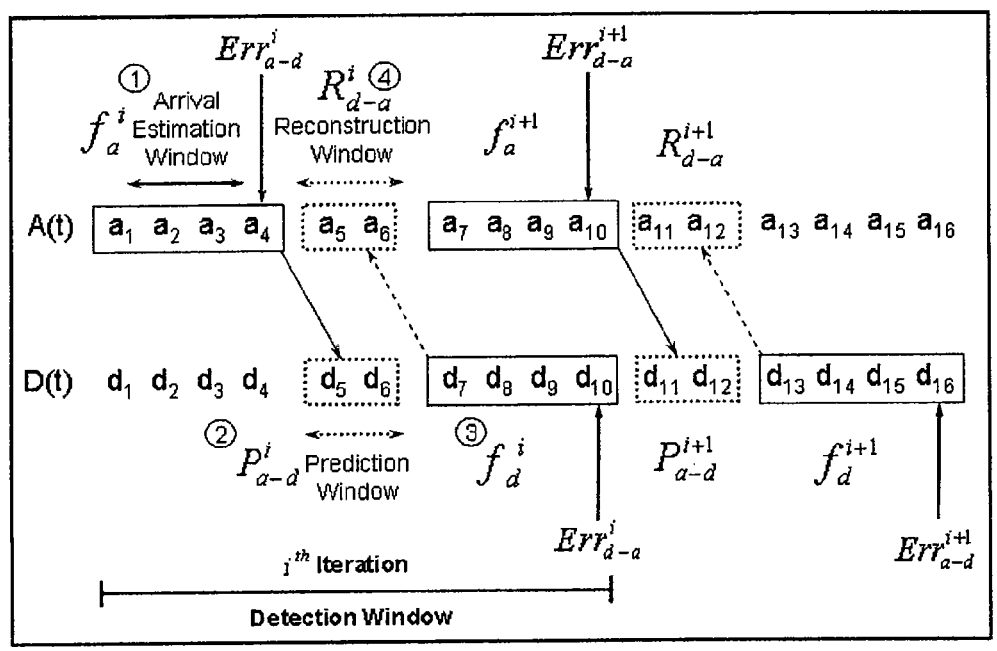
Figure 2. Diagram showing the four significant steps in SYN Flooding detection algorithm.

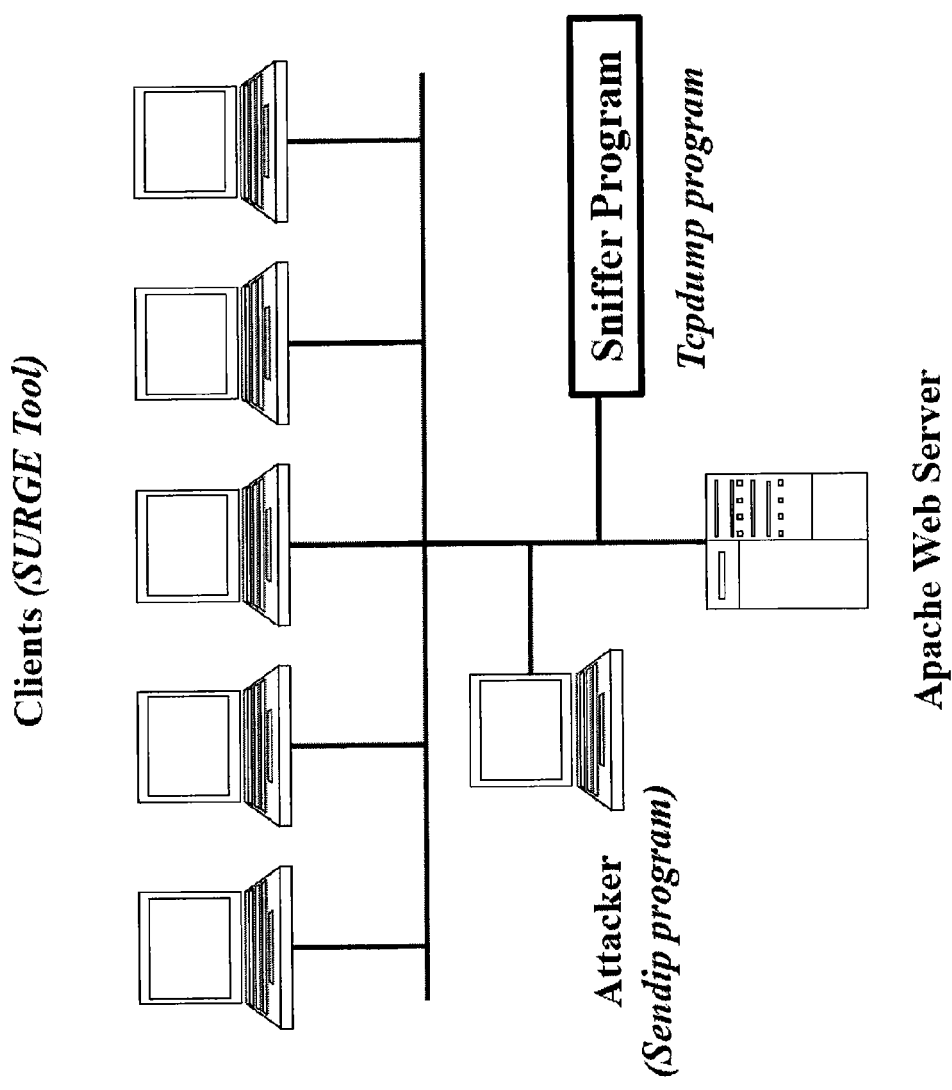
Figure 3. Experimental setup used to generate approximately seven hours of TCP data.

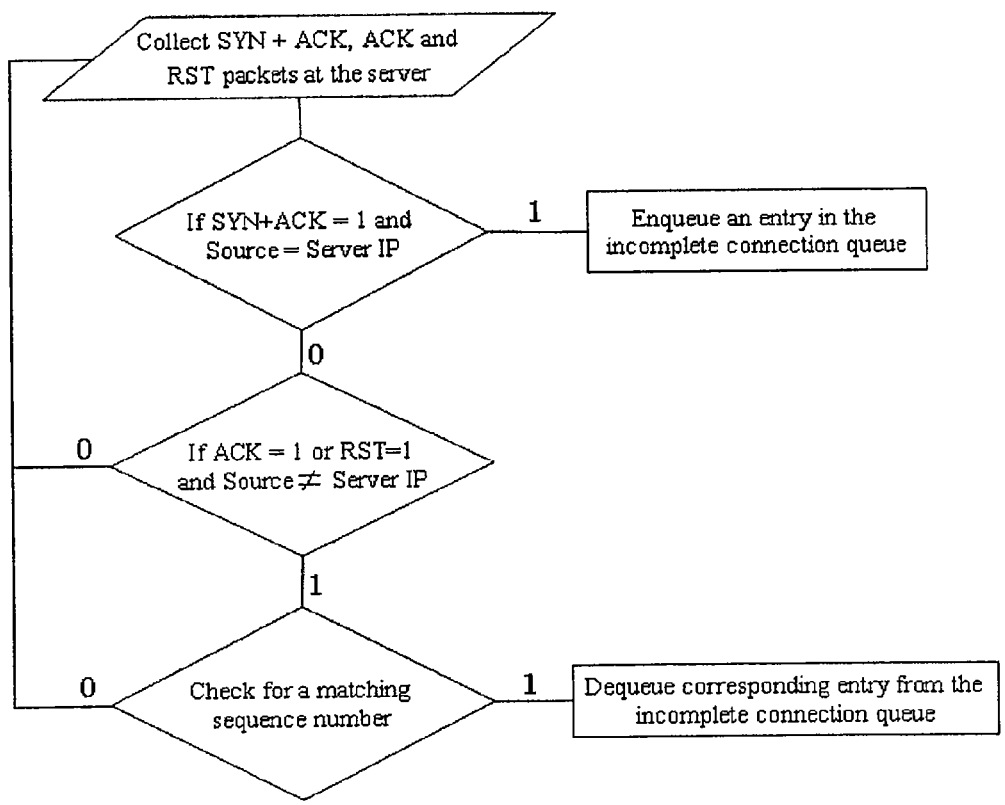
Figure 4. Flow chart illustrating the classification of packets

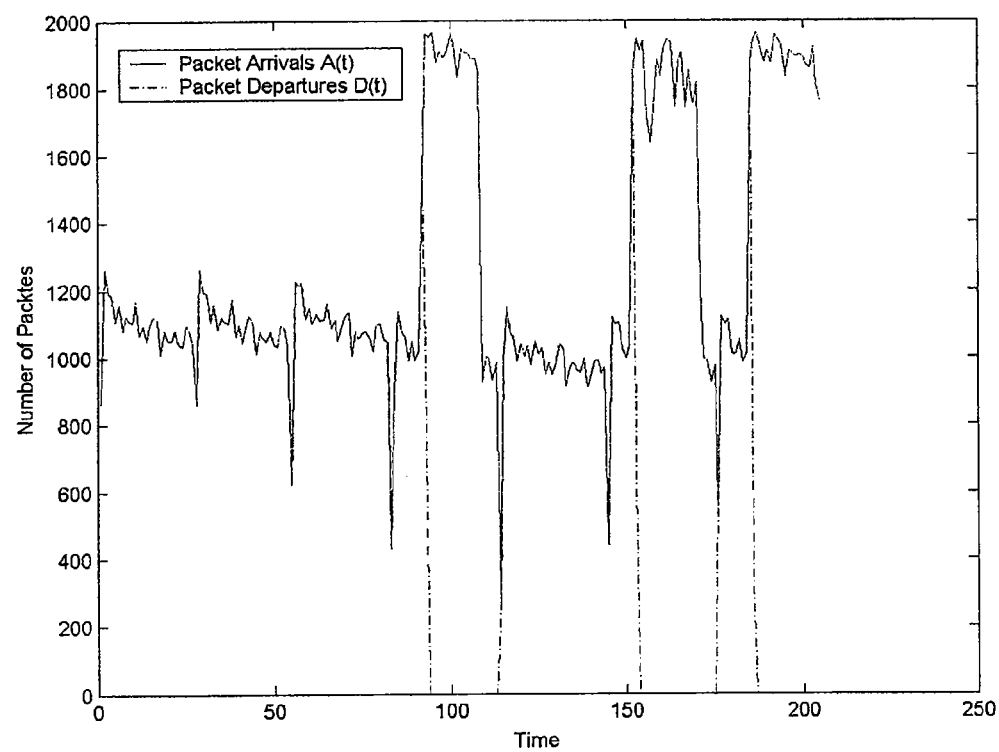
Figure 5. The number of SYN, ACK and RST packets at the Web server handling requests from 100 clients (Dataset 1) during normal and attack periods.

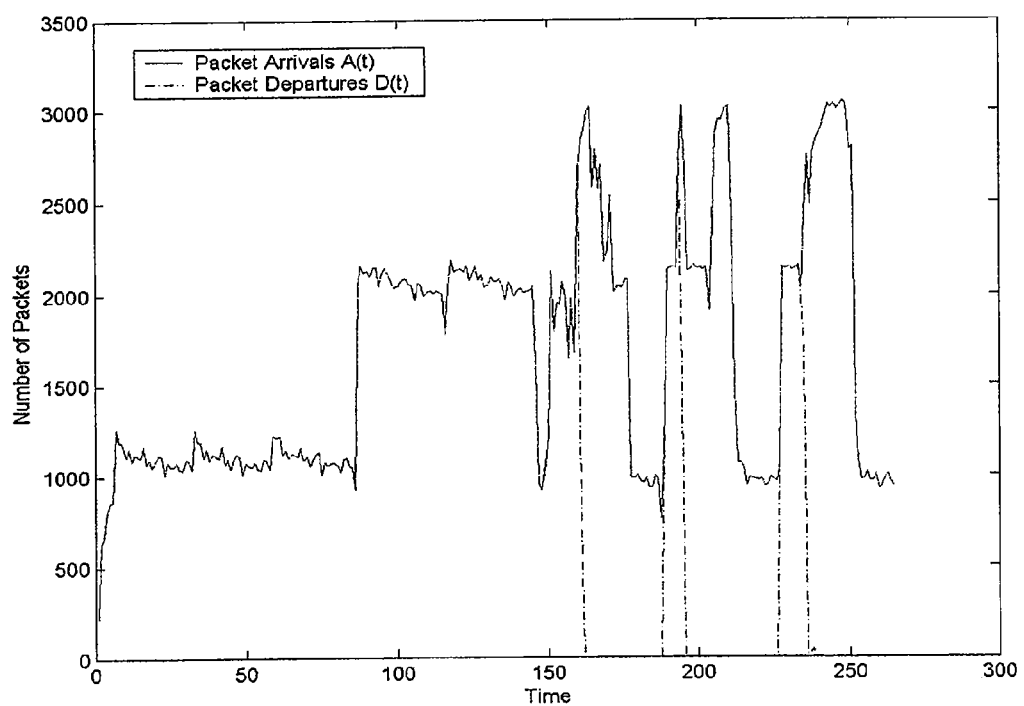
Figure 6. The number of SYN, ACK and RST packets at the Web server handling requests from 200 clients with two varying normal workloads and attacks (Dataset 5).

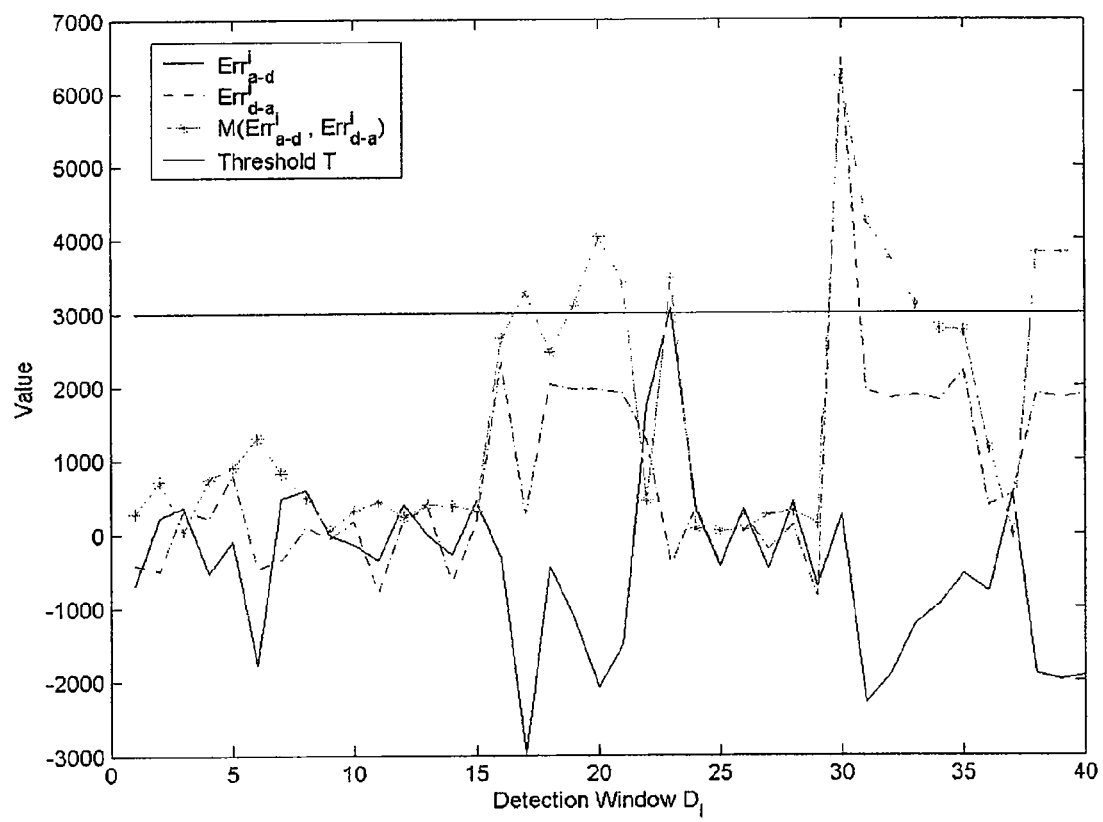
Figure 7. The variation in prediction errors $Err_{a-d}^i$ and $Err_{d-a}^i$ for Dataset 1.

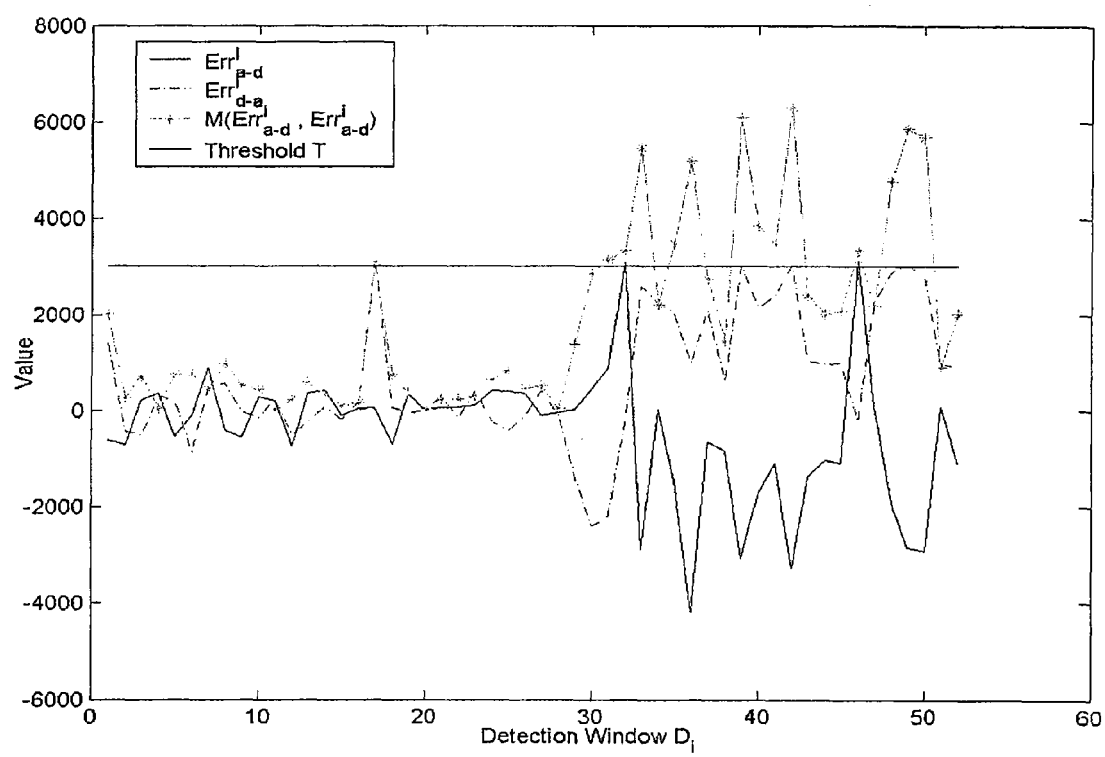
Figure 8. The variation in prediction errors $Err^i_{a-d}$ and $Err^i_{d-a}$ for Dataset 5.

METHOD TO DETECT SYN FLOOD ATTACK

PRIORITY CLAIM

This application is a continuation of U.S. application Ser. No. 11/844,841, filed on Aug. 24, 2007, which is now U.S. Pat. No. 7,865,954, and hereby claims the priority thereof.

FUNDING

Supported in part by the US Army Research Office under Grant No. DAAD 19-01-1-0646 and the government has certain rights in the invention.

FIELD OF INVENTION

This invention relates to methods to detect an attack on a web site, and in particular, a denial of service attack, executed through SYN flooding.

BACKGROUND OF THE INVENTION

Recent Denial-of-Service (DoS) attacks on major e-commerce web sites, like yahoo.com, amazon.com and ebay.com, have been very successful in disrupting their Internet activity for a considerable period of time. The popularity of DoS attacks in the hacker-community may be attributed to the vulnerability of interconnected computer systems and the ease with which DoS attacks can be launched over the Internet. SYN Flooding attacks are one of the most popular forms of DoS attacks that exploit the TCP's 3-way handshake connection mechanism and its limitation in maintaining the 'Incomplete Connection Queue.'

To initiate a normal TCP connection, the client sends a SYN packet to the server. The server creates a new entry on the 'incomplete connection queue' for the SYN packet that has arrived, and responds by sending a SYN+ACK packet back to the initiating client. The client then acknowledges the server by sending an ACK packet (generally, ACK=SYN+ACK+1), thus completing the TCP 3-way handshake. See FIG. 1. Once the final ACK is received from the client, the entry in the incomplete connection queue for this connection is discarded. Most Berkeley-derived TCP implementations maintain an Incomplete Connection Queue for each listening socket (for instance, for a FTP server, an Email server, or a Web server). An entry remains on the Incomplete Connection Queue ("ICQ") until the SYN+ACK packet is acknowledged by the client, or until the entry times out. The connection timeout for each entry is typically set to 75 seconds.

To launch a SYN Flooding attack, an attacker floods the victim server with a huge number of SYN packets originating from spoofed IP sources. Attempted connection has an associated entry in the ICQ. The server responds to the SYN packet with the return ACK. However, the initiating "client" fails to respond to the ACK with the SYN+ACK, hence, leaving the entry in the ICQ for this attempt until time out. With a sufficient number of attempts, the ICQ will completely fill, overwhelming the system due to the inability to log new incoming calls in the ICQ. Due to a filled ICQ, the server rejects all incoming connections, even those originating from legitimate sources, causing a denial of service. To clear the system, it may be necessary to shut down and restart, resulting in downtime and data loss.

Prior art in attack detection schemes can be classified into two categories: (1) 'Stateful' mechanisms, which maintain a per-connection state, and (2) 'Stateless' mechanisms which do not maintain a per-connection state. SYN Cache, SYN Cookies, Synkill and SynProxying are some examples of 'Stateful' approaches. The SYN Cache replaces the per-socket linear incomplete connection queue with a global hash table. The 'Cachelimit' parameter imposes an upper bound on the memory that the SYN Cache uses and the 'BucketSize' parameter limits number of entries per hash bucket, bounding the time required for searching the entries. An entry overflow is handled by performing a FIFO drop of an entry on the hash list. SYN Cookies replace the Syn Cache's overflow handling mechanism by sending a SYN Cookie instead of dropping an entry from the hash list. A cookie contains an Initial Sequence Number, which is returned in the final phase of the TCP's three way handshake. As connection establishment is performed by the returning ACK, a secret is used to validate the connection. The Synkill algorithm classifies the addresses of all incoming packets into 'good' or 'evil' classes based on observed network traffic and input supplied by the administrator. A decision process based on a finite state machine determines the correct state membership of each incoming packet and sends RST packets in response to deter connection establishment attempts from evil IP sources. SynProxying sets a threshold on the number of SYN packets per second passing through the firewall. On reaching the threshold, the firewall proxies all incoming SYN packets by storing the incomplete connections in a queue. The incomplete connections remain in the firewall until the connection is completed or the request times out. All 'Stateful' approaches are by themselves vulnerable to flooding attacks.

'Stateless' non-parametric algorithms based on Sequential and Batch-Sequential Change Point Detection theory to detect SYN Flooding attacks have been developed by Wang et al. "Detecting SYN Flooding Attacks," Proceedings of IEEE Infocom, June 2002. This method uses the discrepancy between the SYN-FIN (RST) pairs to detect SYN flooding. The weakness in using the discrepancy between SYN-FIN pairs as a criterion for detecting SYN flooding is that an attacker can paralyze the detection mechanism by flooding a mixture of SYN and FIN (RST) packets. Moreover, change point detection based algorithms may be sensitive to daytime variations in the Internet traffic, increasing the number of false positives when the attack triggering threshold is inappropriately selected.

SUMMARY OF THE INVENTION

The SFD (SYN Flood Detection) System is an adaptive sliding-window algorithm to detect SYN Flooding attacks based on the discrepancy between the packet arrivals and departures in the ICQ. The SFD System algorithm is based on the observation that there is an inherent delay between arrivals and departures. A function-estimate of the arrivals is a reasonably good estimate of the departures with a time lead of '$\alpha$', and inversely, the function-estimate of the departures is a reasonably good estimate of the arrivals with a time lag '$\alpha$', where '$\alpha$' is the service time or lag time of the queuing system. The implemented algorithm uses polynomial estimation for extrapolating the number of arrivals and departures.

BRIEF DESCRIPTION OF THE FIGURES

FIG. 1 is a diagrammatic representation of (a) a normal TCP 3-Way Handshake mechanism, and (b) a SYN Flooding attack scenario in which the attacker floods the victim server with SYN packets originating from inexistent or spoofed IP sources.

FIG. 2 is a diagram showing the four major steps in the detection algorithm. '$A(t)$' and '$D(t)$' are the number of SYN packets entering (SYN Arrivals) and leaving (SYN Departures) the incomplete connection queue during every observation period 'T'.

FIG. 3 is a diagram depicting an experimental setup used to generate TCP data containing normal background traffic and labeled attacks. The experimental setup comprises of seven Pentium 2 PCs. Five PCs were used to generate Web workloads using SURGE program, a PC was configured as an Apache Web server, and another PC was used to generate SYN Flooding attacks.

FIG. 4 is a flow chart illustrating the classification of packets to obtain the number of packets arriving into and departing from the incomplete connection queue.

FIG. 5 is a plot of the number of SYN, ACK and RST packets at the Web server handling requests from 100 clients (Dataset 1) during normal and attack periods. The plot in solid line indicates the number of SYN packets entering the incomplete connection queue. The plot in dashed line indicates the number of ACK and RST packets. Note that the number of packets entering and leaving the incomplete connection queue overlap during normal activity at the Web server.

FIG. 6 is a plot of the number of SYN, ACK and RST packets at the Web server handling requests from 200 clients with two varying normal workloads and attacks (Dataset 5). The plot in solid line indicates the number of SYN packets entering the incomplete connection queue. The plot in dashed line indicates the number of ACK and RST packets. Note that the number of packets entering and leaving the incomplete connection queue overlap during normal activity at the Web server.

FIG. 7 is a plot showing the variation in prediction errors $Err_{a-d}{}^i$ and $Err_{d-a}{}^i$ for Dataset 1. The plot in solid line indicates the prediction error $Err_{a-d}{}^i$ and the plot in dashed line indicates the reconstruction error $Err_{d-a}{}^i$ in detection window $D_i$. The '*' marked plot indicates the difference between the two errors. The horizontal (solid) line shows the threshold parameter τ. The technique flags all detection windows $D_i$ which $M(Err_{d-a}{}^i - Err_{a-d}{}^i) > \tau$.

FIG. 8 is a plot similar to FIG. 7, but for Dataset 5. The '*' marked plot indicates the Manhattan distance 'M' between the two error values. The technique flags all detection windows $D_i$ in which $M(Err_{d-a}{}^i - Err_{a-d}{}^i) > \tau$.

DETAIL DESCRIPTION OF THE INVENTION

Arrivals are the number of SYN packets arriving into the Incomplete Connection Queue in a designated time period (i.e. either the number of SYN's per designated unit time, or the number of SYN+ACK, per designated unit time). SYN Packet Departures are the number of SYN packets "leaving" the queue on receiving an acknowledgement from the client in a designated period of time (i.e. the number of ACK's received per designated period of time). In general, arrivals will track departures, but the departures will be "delayed" from its arrival by the time to complete the handshaking between the client/server. For instance, in period of heavy traffic, upon initiation of heavy traffic, arrivals will exceed departures. As the handshaking process is completed, departures will "catchup" will arrivals, and when the heavy traffic ceases, departures will exceed arrivals as the queue empties.

When data traffic is normal, with normal fluctuations, actual (arrivals—"delayed departures") will hover around zero. As traffic increases the actual (arrivals—"delayed departures") should also hover around zero, if the delay approximates the delays need to complete handshaking. In the presence of an attack, arrivals will exceed departures, as residence time in the queue escalates.

The technique uses extrapolation of a fitted function (polynomials have been implemented) to (1) predict arrivals "forward in time" to a predicted time interval, and (2) predict departures "backward in time" to a reconstruction time interval. The prediction forward or backward in time accounts for the handshaking delays. In the presence of an attack: (a) arrivals will increase, but without a consequent increase in departures, even after accounting for handshaking delays (departures will increase after system timeout as unanswered ACKs are dropped, but the attack may overwhelm the system by this time); and (b) departures will decrease as "attack" attempts begin to populate or fill the queue.

A function is fitted to the arrivals a(t) in a designated estimation window, and similarly, a function is fitted to the departures d(t) in another designated estimation window. For a given "detection window," the estimation window for departures is delayed from that for the arrivals by a predetermined time period. The "estimation window" length for arrivals does not have to match that of the "estimation window" length for departures. Alternatively, the fitted function could be the average value, a running sum, or some other mathematical manipulation.

Polynomials have been used as the fitted function $f_a$ (for arrivals) and $f_d$ (for departures). Given a set of data points ($x_1$, $y_1$), . . . , ($x_i$, $y_i$), a polynomial $f(x) = P_m = a + bx + cx^2 + dx^3 + \ldots + lx^{m-1}$ is fitted to the data points using the Method of Least Squares where the best fitting curve has the least square error $$\prod = \sum_{k=1}^{i} (y_i - f(x_i))^2.$$

Polynomial fitting requires that we use a 'Estimation Window Size' of at least N+1 to fit a polynomial of degree N.

As shown in FIG. 2, define the Detection Time-window $D_i$ as the time interval that the technique uses in iteration 'i' to detect an attack. The Arrival Estimation Time-window $E_a{}^i$ and the Departure Estimation Time-window $E_d{}^i$ are the time intervals for which we construct the Arrival and Departure Functions $f_a{}^i$ and $f_d{}^i$ respectively. Note that in general, the length of $E_d{}^i$ equals the length of $E_a{}^i$, but the start of $E_d{}^i = E_a{}^i + \delta$ (i.e., the window for estimating departures starts at a later time (delay or δ) than that of the arrival estimation window). The Prediction Time-window $P_{a-d}{}^i$ is the time intervals for which the technique calculates the difference between the actual departures d(t) and the Arrival Function '$f_a{}^i$'. Reconstruction Time-window $R_{d-a}{}^i$ is the time-intervals for which the technique calculates the difference between actual arrivals a(t) and the Departure Function. In general, $P_{a-d}{}^i = R_{d-a}{}^i$, that is, it is preferred that the technique estimates arrivals forward, and departures backward, and compares against actual data within the same prediction window. These relationships are shown in FIG. 2 for a particular $i^{th}$ iteration.

$Err_{a-d}{}^i$ denotes the maximum signed difference in the prediction window $P_{a-d}{}^i$ of $(f_a{}^i(t) - d(t))$, for $t \in P_{a-d}{}^i$; and $Err_{d-a}{}^i$ is the maximum signed difference in the reconstruction window $R_{d-a}{}^i$ of $(a(t) - f_d{}^i(t))$, for $t \in R_{d-a}{}^i$, again as shown in FIG. 2. At the start of an attack, $Err_{a-d}{}^i$ should be positive and tend to grow larger, and $Err_{d-a}{}^i$ to be negative and tend to grow smaller.

The System is an adaptive sliding-window technique. The technique is an iterative procedure based on two hypothesis: (1) the arrival function '$f_a{}^i$' obtained from estimating a function for the samples in Arrival Estimation Window $E_a{}^i$ should reasonably predict departures in the forward looking Prediction Time-window $P_{a-d}^i$, and (2) the departure function '$f_d^i$' obtained from estimating a function for the samples in Departure Estimation Time-window $E_d^i$ should reasonably reconstruct the arrivals in the rearward looking Reconstruction Time-window $R_{d-a}^i$. This hypothesis is based upon the observation that arrivals—delayed departures should hover around the value of 0. The technique will base its "attack" analysis on the difference between the calculated arrivals and actual departures, or the calculated arrivals and actual departures, or both. That is $(f_d^i(t)-a(t))$ or $(f_a^i(t)-d(t))$, where $f_d^i$ and $f_a^i$ are the fitted prediction functions of the departures and arrivals in the prediction window; and a(t) and d(t) are the actual arrivals and departures respectively, during the prediction window.

FIG. 2 illustrates the technique. In the figure, the size of the "detection" window $D_i$ is set to 10. The sizes of estimation windows $E_a^i$ and $E_d^i$ are set to 4. The prediction window sizes are $P_{a-d}^i$ and $R_{d-a}^i$ are set to 2. In this instance, $P_{a-d}^i$ and $R_{d-a}^i$ are identical. Hence $D_i=E_a^i+E_d^i+P_{a-d}^i$ (or $+R_{d-a}^i$). Note that the prediction window is contiguous with the estimation windows, but this is not necessary. For instance, if the average expected delay of the ACK is 10 samples and the prediction window is 5 samples, a contiguous prediction window would not be desired.

The prediction and reconstruction errors $Err_{a-d}^i$ and $Err_{d-a}^i$ are initialized to 0. The first step of the algorithm is to estimate functions $f_a^i$ and $f_d^i$ for the samples in the $E_a^i$ and $E_d^i$ respectfully (in this example, a third degree polynomial is fitted). The second step is to calculate the differences $(f_d^i(t)-d(t))$ in the window $P_{a-d}^i$, and the differences $(f_d^i(t)-a(t))$ in the window $R_{d-a}^i$. The third step involves calculation of prediction error $Err_{a-d}^i$ as maximum of the singed value of in $(f_a^i(t)-d(t))$ in the window $P_{a-d}^i$, and calculation of reconstruction error $Err_{d-a}^i$ as the maximum of the signed value of $(f_d^i(t)-a(t))$ in the window $R_{d-a}^i$. In the presence of an attack, we anticipate $Err_{a-d}^i$ to be positive and to grow, and $Err_{d-a}^i$ to be negative and to grow small. Instead of the signed maximum (which chooses the maximum of the absolute value, and then assigns the sign (+ or −) of the number chosen to the result) other metrics or distance functions can be used to determine the "distance" between $(f_d^i(t)-a(t))$ and $(f_a^i(t)-d(t))$.

High values of $Err_{a-d}^i$ and $Err_{d-a}^i$ indicate the failure of the algorithm to predict and/or reconstruct arrivals and departures respectively, and $Err_{a-d}^i$ and $Err_{d-a}^i$ can be used to identify a SYN flooding attack (for instance, if $abs(Err_{a-d}^i) > \alpha$, or if $abs(Err_{d-a}^i) > \beta$, identify an attack). Each "Err" function is an indicator of discrepancies between actual data and estimated or predicted data. Hence, both "Err" functions can be used to identify a DOS attack. A more robust measure for identifying an attack is believed to be the difference between $Err_{a-d}^i$ and $Err_{d-a}^i$ calculated using the Manhattan distance metric, (or some other chosen metric), and identifying an attack if the difference is greater than some threshold r. Because the two error functions are expected to move in opposite directions in the presence of an attack, combining the two Err functions should predict an attack earlier than either Err function alone. If another metric is used to calculate the Err functions and the result is both Err functions are positive, then $Err_{a-d}^i + Err_{d-a}^i$ should be used in the attack analysis, instead of $Err_{a-d}^i - Err_{d-a}^i$. Alternatively, the absolute value of the two Err functions could be combined. Once an attack is predicted, notification of an attack should be provided to a user, where a user can include another program that would analyze the incoming requests to help analyze the nature of the threat.

After completing the technique in time window $D_i$, the Detection window '$D_i$' is slid forward to become '$D_{i+1}$' and the procedure repeated in the new window. As shown in the example of FIG. 2, the window is slid forward to avoid overlap with the prior data, that is, that the new window starts at the samples given by the index '$E_a^i+P_{a-d}^i$' however, the procedure can be implemented with overlapping windows, for instance, the new window could be moved only one sample in time. Overlapping windows should enable earlier detection of an attack, but the overlap comes at a cost, that being increased computations and a slowness of the algorithm.

As can be seen, the technique can be implemented to work in almost real time. The algorithm may include a "backward" looking component (e.g., the calculation of $f_d^i$) and hence, when $f_d^i$ is calculated, the algorithm is not real time, but would only be delayed from real time calculations by the departure estimation window length, as the samples in this window are used to compute $f_d^i$.

Testing

The technique was tested using seven Pentium 7 PC's out of which one PC was configured as an Apache Web server hosting about 2000 files; five PCs were used as Client Systems that generate different Web workloads; and a PC was configured to launch SYN Flooding attack. See FIG. 3. The SOMAXCONN parameter of the server PC was set to 1024. We use the Scalable URL Reference Generator (SURGE) program to generate synthetic Web traffic representative of original Web traffic observed at a real-time Web server. The SURGE programs were configured to generate non-persistent HTTP requests for 100 to 400 clients.

A SYN Flooding attack was generated using 'sendip' program. See FIG. 3. The 'sendip' is a command line tool that uses 'libpcap' library to forge an arbitrary number of IP, TCP, UDP, and RIP packets. We configured the 'sendip' program to flood the Web server with SYN packets at a rate of 3500 packets per minute. We use 'tcpdump' (see FIG. 3) to collect all incoming and outgoing packets at the Web server. The 'tcpdump' program has been configured to capture all TCP packets entering and leaving the Web server at a predefined port (port 80).

Table 1 summarizes the details of the Tcpdump datasets. With the experimental setup discussed above, we generated seven datasets containing normal background TCP traffic and labeled attack traffic. The 'clients' column in Table 1 indicates the Web workloads in terms of number of clients simultaneously accessing the Web server. The datasets with 'n+m' clients represent simulations which start with HTTP requests generated by 'n' clients. The request workload of the server is increased during the simulation run by adding 'm' clients to represent the day-time variations that occur in the workloads of an operational Web server. The 'Duration' column indicates the duration of each dataset. Number of attacks in each dataset and the duration of each attack are also indicated in Table 1.

TABLE 1

Seven hours of TCP data was generated using an isolated experimental setup. Each dataset contains labeled attacks and normal background traffic.

| Dataset | Clients | Duration (in min) | Number of Attacks | Attack Duration (in min) | Attack Start Time-End Time (in min) |
|---|---|---|---|---|---|
| 1 | 100 | 51.25 | 3 | 16.50 | 23.75-29.25 |
| | | | | | 38.25-44.25 |
| | | | | | 46.25-51.25 |
| 2 | 200 | 54.00 | 3 | 23.00 | 28.00-35.00 |
| | | | | | 36.25-44.50 |
| | | | | | 46.25-54.00 |

TABLE 1-continued

Seven hours of TCP data was generated using an isolated experimental setup. Each dataset contains labeled attacks and normal background traffic.

| Dataset | Clients | Duration (in min) | Number of Attacks | Attack Duration (in min) | Attack Start Time-End Time (in min) |
|---|---|---|---|---|---|
| 3 | 300 | 59.00 | 3 | 22.00 | 12.75-20.25 |
|   |     |       |   |       | 23.00-30.00 |
|   |     |       |   |       | 32.25-39.75 |
| 4 | 400 | 58.25 | 3 | 22.50 | 22.00-29.00 |
|   |     |       |   |       | 30.75-38.75 |
|   |     |       |   |       | 41.00-48.50 |
| 5 | 100 + 100 | 66.25 | 3 | 22.75 | 40.00-47.00 |
|   |     |       |   |       | 48.50-56.50 |
|   |     |       |   |       | 58.50-66.25 |
| 6 | 200 + 100 | 74.25 | 3 | 21.75 | 47.25-54.75 |
|   |     |       |   |       | 57.50-64.25 |
|   |     |       |   |       | 66.75-74.25 |
| 7 | 300 + 100 | 78.00 | 3 | 22.50 | 51.50-58.50 |
|   |     |       |   |       | 60.25-68.25 |
|   |     |       |   |       | 70.50-78.00 |

The behavior of the incomplete connection queue is simulated on the dataset. The incomplete connection queue can either be implemented as a linear list or a hash table. We chose to implement it as a linear list of size 1024 which corresponds to the SOMAXCONN parameter at the server. We classified all packets collected at the Web server into SYN+ACK packets, ACK, and RST packets by inspecting the TCP packet headers. The flow chart in FIG. 4 illustrates the classification logic used in the test. We collected the number of SYN packets arriving into the incomplete connection queue and departing from the incomplete connection queue during every observation period 't'. For each of the seven datasets, we obtain two time series a(t) (for the number of arrivals per time 't'), and d(t) (for the number of departures in every time interval 't' on each day). The sampling time 't' of the arrivals and departures effects the detection delay of the Flooding Detection System (FDS). FIG. 5 shows the number of SYN packets (arrivals a(t)), ACK and RST packets (departures d(t)) at the Web server handling HTTP requests from 100 clients (dataset 1) sampled at the rate of T=15 seconds (that is, the $a(1)=\Sigma a(i)$ $0.0 \leq i<15$, $a(2)=\Sigma a(i)$ $15.0 \leq i<30$, etc., and similarly for d(t). That is, we obtain two time series: (1) the time series 'a(t)' gives the number of packets entering the incomplete connection queue every T seconds and (2) the time series 'd(t)' gives the number of packets leaving the incomplete connection queue every T seconds. Here, T is the sampling time window size. FIG. 6 gives the number of arrivals a(t), and departures d(t) at the server handling requests with two different workloads of 100 and 200 clients (dataset 5).

The size of the detection window $D_i$ set to 9. The sizes of estimation windows $E_a^i$ and $E_d^i$ were set to 4. The prediction window sizes $P_{a-d}^i$ and $R_{d-a}^i$ were set to 1. The number of arrivals into and departures from the incomplete connection queue were sampled at 15 second intervals. The attack detection threshold has been set to $\tau=3000$ for all the datasets.

The results of the technique are analyzed using three factors: (1) detection accuracy, (2) detection delay, and (3) false positive rate to measure the performance of our algorithm. Detection accuracy is the ratio of the total number of attacks detected by an FDS to the number of attacks in the test datasets. Detection delay is the time taken by the FDS to recognize an attack after the attack has actually occurred. The false positive rate is the number of normal traffic instances that an FDS flags as an attack. Table 2 gives the attack start times, attack detection times, attack detection delays, and the percentage of false alarms obtained when the technique was run on the seven datasets. The false alarm rate and detection delay for the datasets was recorded at 100% detection accuracy i.e., when the technique detected all occurrences of SYN flooding attack in the datasets. From the values in Table 2 we calculated the average number of false positives and the average detection latency of the technique. The average number of false alarms recorded over seven hours of normal TCP activity was 0.021 and the average detection latency over 21 attack instances was 116 seconds.

TABLE 2

The 'Attack Start Time' is the time at which the attack is launched in the simulated datasets. 'Detection Time' is time at which the algorithm detects an attack. 'Detection Delay' is the time difference between the Attack Start Time and Detection Time.

| Dataset | Attack Start Time | Detection Time | Detection Delay | Detection | % of False Positives |
|---|---|---|---|---|---|
| 100 | 23.75 | 26.25 | 2.25 | Yes | 2.50 |
|     | 38.25 | 38.75 | 0.50 |     |      |
|     | 46.25 | 48.75 | 1.50 |     |      |
| 200 | 28.00 | 28.75 | 0.75 | Yes | 2.37 |
|     | 36.25 | 37.50 | 1.25 |     |      |
|     | 46.25 | 47.50 | 1.25 |     |      |
| 300 | 12.75 | 13.75 | 1.00 | Yes | 0 |
|     | 23.00 | 23.75 | 0.75 |     |   |
|     | 32.25 | 33.75 | 1.50 |     |   |
| 400 | 22.00 | 23.75 | 1.75 | Yes | 0 |
|     | 30.75 | 31.25 | 0.50 |     |   |
|     | 41.00 | 42.50 | 1.50 |     |   |
| 100 + 100 | 40.00 | 40.00 | 0.00 | Yes | 1.92 |
|     | 48.50 | 50.00 | 1.50 |     |      |
|     | 58.50 | 58.75 | 0.25 |     |      |
| 200 + 100 | 47.25 | 48.75 | 1.50 | Yes | 3.42 |
|     | 57.50 | 60.00 | 2.50 |     |      |
|     | 66.75 | 67.50 | 0.75 |     |      |
| 300 + 100 | 51.50 | 53.75 | 2.25 | Yes | 4.88 |
|     | 60.25 | 62.50 | 2.25 |     |      |
|     | 70.50 | 71.25 | 0.75 |     |      |

The plot in FIG. 7 illustrates the variation in the prediction errors $Err_{a-d}^i$ and $Err_{d-a}^i$ for dataset 1. The plots in FIG. 8 illustrate the variation in the prediction errors $Err_{a-d}^i$ and $Err_{d-a}^i$, when the technique was run on Dataset 5. The horizontal (solid) line in the figures indicate that the threshold value for signaling a SYN flooding attack was set to 3000. The technique signals a SYN flooding attack whenever the difference between the prediction errors is greater than the threshold. In FIG. 7, the technique signaled an attack three times (1) between the $15^{th}$ and $20^{th}$ detection window, (2) between the $20^{th}$ and $25^{th}$ detection window, and (3) between the $35^{th}$ and $40^{th}$ detection window. Similarly, in FIG. 8, the technique signaled an attack three times (1) between the $25^{th}$ and $30^{th}$ detection window, (2) between the $30^{th}$ and $35^{th}$ detection window, and (3) between the $35^{th}$ and $40^{th}$ detection window.

The algorithm as implemented: (1) is stateless, i.e., it does not allocate resources on a per-connection basis to monitor SYN flooding attacks (the statelessness of the algorithm makes it resilient to SYN flooding); (2) is reliable because it uses the discrepancy between the number of packets entering and leaving the incomplete connection queue to detect SYN flooding (this discrepancy is a foolproof signature of an effective SYN flooding attack in progress); and (3) does not require separate signature-learning sessions to identify SYN flooding attacks and is therefore immediately operational when deployed on a TCP/IP based network.

To implement the technique, the code will be associated with a server of interest, either Web server, email server, FTP server, or any other server type that communicates to the outside world. The code implementation may be constructed to work with all servers in a multiple server configuration. The code is constructed to monitor the external communication ports for SYN (or SYN+ACK) and ACK. Generally, each server communicates over separate ports, so in a multi server embodiment, the installed algorithm would monitor several ports.

The code can be implemented in several embodiments. For instance, the embodiment can contain and maintain a "real time" ICQ queue, or several ICQ queues (as later describes, these queues can be dispensed with if the detection algorithm to be implemented will not perform an analysis on the incoming/outgoing data to identify the source or other aspects of the attack). The queue may be implemented as a hash table or a table queue. Each queue represents either a SYN, or a SYN+ACK, (it is easier to track the SYN+ACK, but the SYN alone can be used) and each entry can have the associated IP address of the SYN request, the port received over (in a multi port configuration), and a time stamp. Hence, as a SYN is received through a designated port (or SYN+ACK sent through the designated port) an entry is made in the ICQ. If the ACK is later received, the embodiment would find the ICQ entry for the associated SYN (or SYN+ACK), and indicate that that entry should be ignored (freeing up the slot in the ICQ) or remove the entry from the ICQ. As can be seen, the constructed queue(s) can be used in a post attack analysis, as the ICQ holds time and IP address information.

To implement the algorithm, a window size is chosen, say 10 seconds. An arrival counter Arr (or Arr(p), where p represents the port) and departure counter Dpt (or Dpt(p)) are established. These counters are incremental counters, that is, during each window, if a SYN is received, Arr=Arr+1, and if an ACK is received, Dpt=Dpt+1. Additionally, the Dpt counter can also account for RST (a 'reset' packet) if desired. A RST packet operates to reset a connection, and to the ICQ, an RST operates as an ACK, e.g., frees a slot in the ICQ. It is preferred that the counter account for an RST, but given that the number of RST packets is much less compared to the ACK numbers, RST can be ignored without substantial impact to the method.

At the end of the window, a(t)=Arr and d(t)=Dpt and the counters are reset to zero for the next window (alternatively, instead of resetting, the counter, the next window could start where the counter left off, that is, the time series would represent a running sum. With a running sum time series, the per window samples can be recovered if needed). In this fashion, we obtain two time series: (1) the time series 'a(t)' gives the number of SYN (or SYN+ACK) packets arriving every T seconds (here 10 seconds) and (2) the time series 'd(t)' gives the number of ACKs received (e.g. representing the number of packets leaving the incomplete connection queue) every T seconds.

As described, the ICQ's are not necessarily required for the algorithm as the incremental counters alone can be used to generate the arrival time series and the departure time series. Required parameters to the algorithm include:
(1) Sample window size for the counters and length of the counters;
(2) Estimation window size for $f_a$;
(3) Estimation window size for $f_d$ (note, (2) and (3) can be the same));
(4) Delay or δ (delta) between an the end of the Estimation window for arrivals and the start of the estimation window of departures;
(5) prediction window size;
(6) relationship of the prediction window to the Estimation Windows;
(7) polynomial degree (assuming a polynomial is the fitted function);
(8) Err size or threshold that indicates attack;

As an attack indicator, the program can be configured to use $\text{Err}_{a-d}{}^i$ or $\text{Err}_{d-a}{}^i$ alone, or a combination (e.g. abs($\text{Err}_{a-d}{}^i - \text{Err}_{d-a}{}^i$), abs($\text{Err}_{a-d}{}^i + \text{Err}_{d-a}{}^i$), or some other combination, such as max($\text{Err}_{a-d}{}^i$, $\text{Err}_{d-a}{}^i$), a linear combination of the err functions, etc). The delays and window size must account for the sample window size. For instance, if the sample window size is 10 seconds, the delay parameter now represents increments of 10 seconds for actual system response. Selection of parameters (extent of sampling or data decimation, prediction window sizes, estimation window sizes, relationship of the windows, degree of polynomial fit, relationship of adjacent detection windows (i.e. how the detection window is slid forward) and thresholds) can be varied during the day or during the week. For instance, if a system experiences heavy traffic during business hours, and light traffic in non-business hours, estimation windows may be shorter in heavy traffic situations and delta delays longer that in a light traffic pattern.

In general, the estimation windows size should be kept small, as longer sizes are more computationally inefficient, and longer estimation windows (or longer sampling decimation) are more likely to reflect smoothed "average conditions" rather than a granular snapshot condition, and hence not as responsive to rapid changes in traffic conditions. Additionally, longer estimation windows result in delayed prediction of an attack, as the backward looking window $E_d{}^i$ must be captured to be used for analysis. For instance, if $E_d{}^i$ is 20 samples long, (each 10 seconds), then the earliest this window could be used to predict an attack is 200 seconds after the attack. The actual chosen values will depend on expected peak traffic and the associated delays in the ACK which can be determined form experience with the server in question.

Generally, for a four sample prediction window, a third degree polynomial is used for the fit. For longer windows, (say 5-7 samples), a third or fourth degree polynomial will generally be suitable. Higher degree polynomial fits raise the computational inefficiency of the technique.

We claim:
1. A method of detecting a SYN flooding attack at a server having a communication port comprising the steps of:
(a) determining the number of SYN signals received or SYN+ACK signals sent over said communication port within a predetermined time length arrival estimation window at predetermined time intervals within said arrival estimation window;
(b) predicting the number of ACK, RST or ACK+RST signals to be received over said communication port in a predetermined time length prediction window at predetermined time intervals within said prediction window, said prediction window being offset in time from said arrival estimation window, where said prediction of the number signals to be received is based upon the number of SYN signals received or SYN+ACK signals sent in said arrival estimation window;
(c) determining the number of ACK or RST or ACK+RST signals received over said port in said prediction window at predetermined time intervals within said prediction window;

(d) comparing said predicted number of signals to be received at predetermined time intervals within said prediction window with said determined number of ACK or RST or ACK+RST signals received at predetermined intervals within said prediction time window to produce a compared value;

(e) predicting a SYN flood attack if said compared value exceeds a predetermined threshold value;

(f) advancing in time said arrival estimation window and said prediction window and repeat steps (a)-(e) with said advanced arrival estimation window and advanced prediction window;

(g) if a SYN flood attack is predicted, providing notification of such to a user.

2. The method of claim 1 where said predetermined time length estimation window is of length N time samples, and said predetermined time length prediction window is of length P time samples, and said step (b) of predicting the number of ACK, RST or ACK+RST signals to be received is undertaken by the steps of (b1) fitting a polynomial of degree less then N to the number of SYN or SYN+ACK signals at said N time samples of said estimation window;

(b2) extrapolating said fitted polynomial to said time samples P of said prediction window.

3. The method of claim 1 wherein said step of comparing said predicted number of ACK, RST or ACK+RST signals to be received at predetermined time intervals within said prediction window with said determined number of ACK or RST or ACK+RST signals at predetermined intervals within said prediction window to produce a compared value comprises finding the maximum absolute value of the difference between said predicted number of signals to be received with said determined number of ACK or RST or ACK+RST signals at each predetermined interval within said prediction time window.

4. A method of detecting a SYN flooding attack at a server having a communication port comprising the steps of:

(a) determining the number of ACK, RST or ACK+RST signals received over said communication port within a predetermined time length departure estimation window at predetermined time intervals within said departure estimation window;

(b) predicting the number of SYN signals to be received or SYN+ACK signals to be sent over said communication port in a predetermined time length reconstruction window at predetermined time intervals within said reconstruction window, said reconstruction window being offset in time from said departure estimation window, where said prediction of the number of SYN signals or SYN+ACK signals is based upon the number of ACK or RST or ACK+RST signals received in said departure estimation window;

(c) determining the number of SYN signals received or SYN+ACK signals sent over said port in said reconstruction window at predetermined time intervals within said reconstruction window;

(d) comparing said predicted number of SYN or SYN+ACK signals at predetermined time intervals within said reconstruction window with said determined number of SYN or SYN+ACK signals at predetermined intervals within said reconstruction window to produce a compared value;

(e) predicting a SYN flood attack if said compared value exceeds a predetermined threshold value;

(f) advancing in time said departure estimation window and said reconstruction window and repeat steps (a)-(e) with said advanced departure estimation window and advanced reconstruction window;

(g) if a SYN flood attack is predicted, providing notification of such to a user.

5. The method of claim 4 wherein said step of comparing said predicted number of SYN or SYN+ACK signals at predetermined time intervals within said reconstruction window with said determined number of SYN or SYN+ACK signals at predetermined intervals within said reconstruction window to produce a compared value comprises finding the maximum absolute value of the difference between said predicted number of SYN or SYN+ACK signals with said determined number of SYN or SYN+ACK signals at each predetermined interval within said reconstruction window.

6. A method of detecting a SYN flooding attack at a server having a communication port comprising the steps of: (a) determining the number of SYN signals received or SYN+ACK signals sent over said communication port within a predetermined time length arrival estimation window at predetermined time intervals within said arrival estimation window;

(b) predicting the number of ACK, RST or ACK+RST signals to be received over said communication port in a predetermined time length prediction window at predetermined time intervals within said prediction window, said prediction window being offset in time from said arrival estimation window, where said prediction of the number of ACK, RST or ACK+RST signals to be received is based upon the number of SYN signals received or SYN+ACK signals sent in said arrival estimation window;

(c) determining the number of ACK or RST or ACK+RST signals received over said port in said prediction window at predetermined time intervals within said prediction window;

(d) comparing said predicted number of ACK, RST or ACK+RST signals to be received at predetermined time intervals within said prediction window with said determined number of ACK or RST or ACK+RST signals received at predetermined intervals within said prediction window to produce a compared first value;

(e) determining the number of ACK, RST or ACK+RST signals received over said communication port within a predetermined time length departure estimation window at predetermined time intervals within said departure estimation window;

(f) predicting the number of SYN signals to be received or SYN+ACK signals to be sent over said communication port in a predetermined time length reconstruction window at predetermined time intervals within said reconstruction window, said reconstruction window being offset in time from said departure estimation window, where said prediction of the number of SYN signals or SYN+ACK signals is based upon the number of ACK or RST or ACK+RST signals received in said departure estimation window;

(g) determining the number of SYN signals received or SYN+ACK signals sent over said port in said reconstruction window at predetermined time intervals within said reconstruction window;

(h) comparing said predicted number of SYN or SYN+ACK signals at predetermined time intervals within said reconstruction window with said determined number of SYN or SYN+ACK signals at predetermined intervals within said reconstruction window to produce a compared second value;

(i) combining the compared first value with the compared second value;

(j) predicting a SYN flood attack if said combined value from step (i) exceeds a predetermined threshold value;

(k) advancing in time said departure estimation window, said arrival estimation window, said prediction window and said reconstruction window and repeat steps (a)-(j) with said advanced arrival estimation window, said advanced departure estimation window, said advanced reconstruction window and said advanced prediction window;

(l) if a SYN flood attack is predicted, providing notification of such to a use.

7. The method of claim 6 wherein said predetermined time length arrival estimation window is of length N time samples, and said predetermined time length departure estimation window is of length M time samples, said prediction window is of length P time samples, said reconstruction window is of length R time samples, and said step of predicting the number of ACK, RST or ACK+RST signals to be received over said communication port is undertaken by the steps of fitting a polynomial of degree less then N to the number of SYN or SYN+ACK signals at said N time samples of said arrival estimation window, and extrapolating said fitted polynomial to said time samples P of said prediction window;

and said step of predicting the number of SYN or SYN+ACK signals is undertaken by the steps of fitting a polynomial of degree less then M to the number of ACK or RST or ACK+RST signals at said M time samples of said departure estimation window and extrapolating said fitted polynomial to said time samples R of said reconstruction window.

8. The method of claim 6 wherein said step of combining the compared second value of step (h) with the compared first value of step (d) is undertaken by adding the absolute values of the compared first and second values.

9. The method of claim 6 wherein said step of combining the compared second value of step (h) with the compared first value of step (d) is undertaken by subtracting said compared second value from step (h) from said compared first value from step (d).

10. The method of claim 6 wherein said step of comparing said predicted number of SYN or SYN+ACK signals at predetermined time intervals within said reconstruction window with said determined number of SYN or SYN+ACK signals at predetermined intervals within said reconstruction window to produce a compared second value comprises finding the maximum absolute value of the difference between said predicted number of SYN or SYN+ACK signals with said determined number of SYN or SYN+ACK signals at each predetermined interval within said reconstruction window.

11. The method of claim 10 further comprising assigning to said compared second value the value of said maximum absolute value found in claim 10, and assigning to said compared second value, the sign of the number from which the maximum absolute value was determined.

12. The method of claim 6 wherein said reconstruction window overlaps said prediction window.

13. The method of claim 12 wherein said overlap is complete overlap.

14. The method of claim 6 wherein said step of comparing said predicted number of ACK, RST or ACK+RST signals to be received at predetermined time intervals within said prediction window with said determined number of ACK or RST or ACK+RST signals at predetermined intervals within said prediction window to produce a compared first value comprises finding the maximum absolute value of the difference between said predicted number of ACK, RST, ACK+RST signals to be received with said determined number of ACK or RST or ACK+RST signals at each predetermined interval within said prediction time window.

15. A computer readable non-transitory medium having encoded thereon a series of machine executable instructions for executing the steps of (a) determining the number of SYN signals received or SYN+ACK signals sent over said communication port within a predetermined time length arrival estimation window at predetermined time intervals within said arrival estimation window;

(b) predicting the number of ACK, RST or ACK+RST signals to be received over said communication port in a predetermined time length prediction window at predetermined time intervals within said prediction window, said prediction window being offset in time from said arrival estimation window, where said prediction of the number of signals to be received is based upon the number of SYN signals received or SYN+ACK signals sent in said arrival estimation window;

(c) determining the number of ACK or RST or ACK+RST signals received over said port in said prediction window at predetermined time intervals within said prediction window;

(d) comparing said predicted number of ACK, RST or ACK+RST signals to be received at predetermined time intervals within said prediction window with said determined number of ACK or RST or ACK+RST signals received at predetermined intervals within said prediction time window to produce a compared value;

(e) predicting a SYN flood attack if said compared value exceeds a predetermined threshold value;

(f) advancing in time said arrival estimation window and said prediction window and repeat steps (a)-(e) with said advanced arrival estimation window and advanced prediction window;

(g) if a SYN flood attack is predicted, providing notification of such to a user.

* * * * *